United States Patent [19]

Bruno

[11] 4,166,525

[45] Sep. 4, 1979

[54] INSTALLATION FOR THE DISTRIBUTION OF FOOD PRODUCTS, PARTICULARLY CONFECTIONERY PRODUCTS

[75] Inventor: Carlo L. Bruno, Oundle, England

[73] Assignee: Alisyncro S.a.s. di Bruno & C., Lieni, Italy

[21] Appl. No.: 870,168

[22] Filed: Jan. 17, 1978

[30] Foreign Application Priority Data

Jan. 25, 1977 [IT] Italy .................. 67154 A/77

[51] Int. Cl.$^2$ .................. B65G 47/31; B65G 47/68
[52] U.S. Cl. .................. 198/437; 198/459;
198/491; 198/572; 198/575; 198/577; 198/579;
198/601
[58] Field of Search .............. 198/358, 369, 434, 436,
198/437, 459, 460, 461, 469, 491, 572, 575, 577,
579, 601

[56] References Cited

U.S. PATENT DOCUMENTS

| 2,497,874 | 2/1950 | Evans et al. | 198/369 X |
| 3,429,416 | 2/1969 | Provost et al. | 198/358 X |
| 3,700,090 | 10/1972 | Pearson | 198/461 X |

FOREIGN PATENT DOCUMENTS

| 2421610 | 11/1974 | Fed. Rep. of Germany | 198/436 |
| 2438780 | 2/1975 | Fed. Rep. of Germany | 198/434 |
| 416294 | 1/1967 | Switzerland | 198/436 |

*Primary Examiner*—Robert B. Reeves
*Assistant Examiner*—James L. Rowland
*Attorney, Agent, or Firm*—Sughrue, Rothwell, Mion, Zinn and Macpeak

[57] ABSTRACT

In an installation for distributing food products such as sweets from a primary conveyor line to respective transverse conveyors leading to packaging machines. A secondary conveyor line having two successive bunching conveyors is arranged to receive intermittently rows of products from the primary conveyor line, through the operation of a deflecting device, and to bunch and align the products prior to transferring them in rows to the transverse conveyor, at a conveying speed which can be matched to the demand of the packaging machines, even though this may differ from the speed of the primary conveyor line.

11 Claims, 9 Drawing Figures

INSTALLATION FOR THE DISTRIBUTION OF FOOD PRODUCTS, PARTICULARLY CONFECTIONERY PRODUCTS

BACKGROUND OF THE INVENTION

The present invention relates to installations for the distribution of food products, particularly confectionery products such as sweets, of the type comprising:

a number of conveyors aligned longitudinally to carry along a primary conveyor line rows of said products extending transverse to the direction of movement of the conveyor;

an alignment device to align in longitudinally spaced apart transverse rows the products carried along such primary conveyor line;

a number of transverse conveyors, arranged transversely with respect to the primary conveyor line, to receive from the latter rows of products and to feed them in single longitudinal files to respective packaging machines, and a number of transfer means, disposed upstream of each transverse conveyor, to transfer rows of products from the primary conveyor line to the respective transverse conveyors.

Installations of this type are known for use in the distribution of products to a number of packaging machines, as illustrated for example in the U.S. Pat. No. 3,429,416. In such installations the transfer of the transverse rows of products from the primary conveyor line to each transverse conveyor takes place directly, as a function of the demand of each packaging machine, independently of the demand of the other packaging machines. In this way the successive transfers of transverse rows of products from the primary conveyor line to each transverse conveyor are distributed randomly since they occur only when the associated packaging machine demands further products. Consequently, when a packaging machine demands products the transfer means may be exhausted of products, or alternatively the transverse rows of products may be conveyed along the whole primary conveyor line without being transferred to any transverse conveyor.

An object of this invention is to avoid the aforesaid disadvantages by providing an installation which is able to satisfy the maximum demand of the packaging machines associated with transverse conveyors of installations of the aforesaid type, so as to reduce to a minimum the quantity of products not transferred at end of the primary conveyor line.

SUMMARY OF THE INVENTION

In order to achieve this object the present invention provides an installation of the aforesaid type, wherein the transfer means each comprise:

a secondary conveyor line for conveying transverse rows of products in a direction generally parallel to the direction of the primary conveyor line; said secondary conveyor line comprising a first bunching conveyor, capable of assuming selectively a first speed matched to that of the primary conveyor line and a second speed, higher than said first speed, and a second bunching conveyor capable of assuming selectively a first speed matched to that of the respective transverse conveyor and a second speed equal to the second speed of the first bunching conveyor;

a deflecting device movable between an inactive position and an active position in which it deflects transverse rows of products from the primary conveyor line to the first bunching conveyor of the secondary conveyor line;

a second alignment device to align the products supplied by the second bunching conveyor of the secondary conveyor line in transverse longitudinally spaced apart rows;

a transverse device for transferring a transverse row of products to the respective transverse conveyor;

drive means for driving intermittently the two bunching conveyors and control means for activating said drive means in a repeated cycle of operations comprising:

(i) moving the first bunching conveyor at its first speed and stopping it when it is saturated with products, simultaneously displacing the deflecting device to its inactive position;

(ii) moving both bunching conveyors at their second speed in order to transfer all the products from the first to the second bunching conveyor;

(iii) moving the second bunching conveyor at its first speed, while the deflecting device is displaced into its active position and the first bunching conveyor resumes its first speed to be re-loaded with products;

(iv) aligning the products fed by the second bunching conveyor in transverse longitudinally spaced apart rows, and (v) transferring the transverse rows of products to the transverse conveyor by means of the transfer device.

The invention enables a more rational feeding of the packaging machines to be effected, allowing considerable reduction in the quantity of products at the end of the primary conveyor line. In fact, the installation according to the invention, every secondary conveyor line is able to saturate the respective packaging machines as it receives periodically from the primary conveyor line a bunched quantity of products which will be fed successively to the packaging machines at a conveying speed which is matched to that demanded by the said machines, and reduced relative to the conveying speed of the primary conveyor line.

According to a preferred embodiment of the invention each alignment device comprises a first and a second conveyor arranged in series with each other, and connecting means associated with the two conveyors; said two conveyors being adapted to operate cyclically between an active alignment position in which the discharge end of the first conveyor is spaced from and lower than the loading end of the second conveyor by an amount sufficient to cause the stoppage and alignment in transverse rows of products against said loading end, and a transfer position, in which the connecting means are activated to ensure the transfer of the aligned products onto the second conveyor. This preferred embodiment has the advantage of effecting the alignment of the products in a simple way.

BRIEF DESCRIPTION OF THE DRAWINGS

The invention will now be described, by way of example, with reference to the accompanying drawings, in which.

DETAILED DESCRIPTION OF THE ILLUSTRATED EMBODIMENT

Reference numeral 10 indicates a conveyor belt emerging from a machine manufacturing food products P, specifically sweets, to be wrapped at a number of packaging stations arranged in series, only the first of which is illustrated in the drawings, and indicated by S. Each packaging station S is formed by a pair of packaging machines, each indicated by reference numeral 12.

A primary conveyor line 14 comprising two conveyor belts 16, 16a is aligned longitudinally with the conveyor belt 10. Between the discharge end of the conveyor belt 10 and the loading end of the conveyor belt 16 an alignment and deflecting device 18 is interposed, as illustrated in detail in FIGS. 3 to 9, and as described later. The alignment and deflecting device 18 is adapted to align the products in transverse longitudinally spaced apart rows and to distribute them onto the conveyor belt 16 or, alternatively, onto a first bunching conveyor belt 20 which is disposed below and aligned longitudinally with the conveyor belt 16. The first bunching belt 20 and a second bunching conveyor belt 24, placed in series with the first bunching conveyor belt 20, form a secondary conveyor line, indicated by 22, which feeds two transverse conveyor belts 44 respectively associated with the two packaging machines 12 of the packaging station S.

The advance of the conveyor belts 20 and 24 is controlled by a motor 26 and an associated speed variator 28, which are both controlled by an electrical control device 30. The control device 30 is connected to two photocells 32 and 34 arranged in correspondence with the discharge ends of the two bunching conveyor belts 20 and 24 respectively.

Downstream of the second bunching conveyor belt 24 there are placed in series an alignment conveyor belt 36 and a transfer conveyor belt 38, the former being adapted to align the products P in longitudinally spaced apart transverse rows, as will be described, in a manner similar to the operation of the alignment and deflecting device 18. The transfer conveyor belt 38 is supported by a fixed support structure 40 and can oscillate between two positions, in the first of which the conveyor belt 38 feeds the transverse rows of products P to a storing platform 42 adapted to receive one row of products at a time and then let it fall, at the desired moment, onto the underlying transverse conveyor belt 44 which feeds the first packaging machine 12. In its second position the transfer conveyor belt 38 transfers the transverse rows of products P onto a conveyor belt 46 which feeds the products to the second transverse conveyor belt 44 feeding the second packaging machine 12 of the packaging station S.

Downstream of the conveyor belt 16 an alignment and deflecting device 18a is arranged which is similar to the device 18 downstream of the feeding conveyor belt 10 and which serves to distribute the products P to the upper conveyor belt 16a, or alternatively, to a secondary conveyor line which feeds the products P to two transverse conveyor belts associated with the two packaging machines 12 of a second packaging station (not shown). The drawings illustrate the first bunching conveyor belt 20a of the second secondary conveyor line and the second of the two transverse conveyor belts 44a fed by said secondary conveyor line. In the example illustrated in the drawings the conveyor belt 16a leads to a bunching device and downstream of the packaging station S there is only one further packaging station, having packaging machines 12 which are fed by the two transverse conveyor belts 44a.

The bunching device, which is schematically illustrated at 48, is adapted to receive from the discharge end of the conveyor belt 16a products P not packaged by the machines 12 and to convey these unwrapped products, as required, to the packaging station S through a lower recycling conveyor belt 50 and a bunching and distributing conveyor belt 52. The upper run of the conveyor belt 52 is capable of controlled displacement in two opposite directions. Reference numeral 54 indicates a conveyor belt interposed between said distribution conveyor belt 52 and the alignment conveyor belt 36 of the first secondary conveyor line 22. The conveyor belt 54 is supported by a fixed support structure 56 so as to be displaceable between an inactive position (illustrated in FIG. 1) in which the bunching of products P is possible on the distribution conveyor belt 52 and an active position in which the loading end of the conveyor belt 54 is aligned with the conveying surface of said distribution conveyor belt 52.

Figure 3:
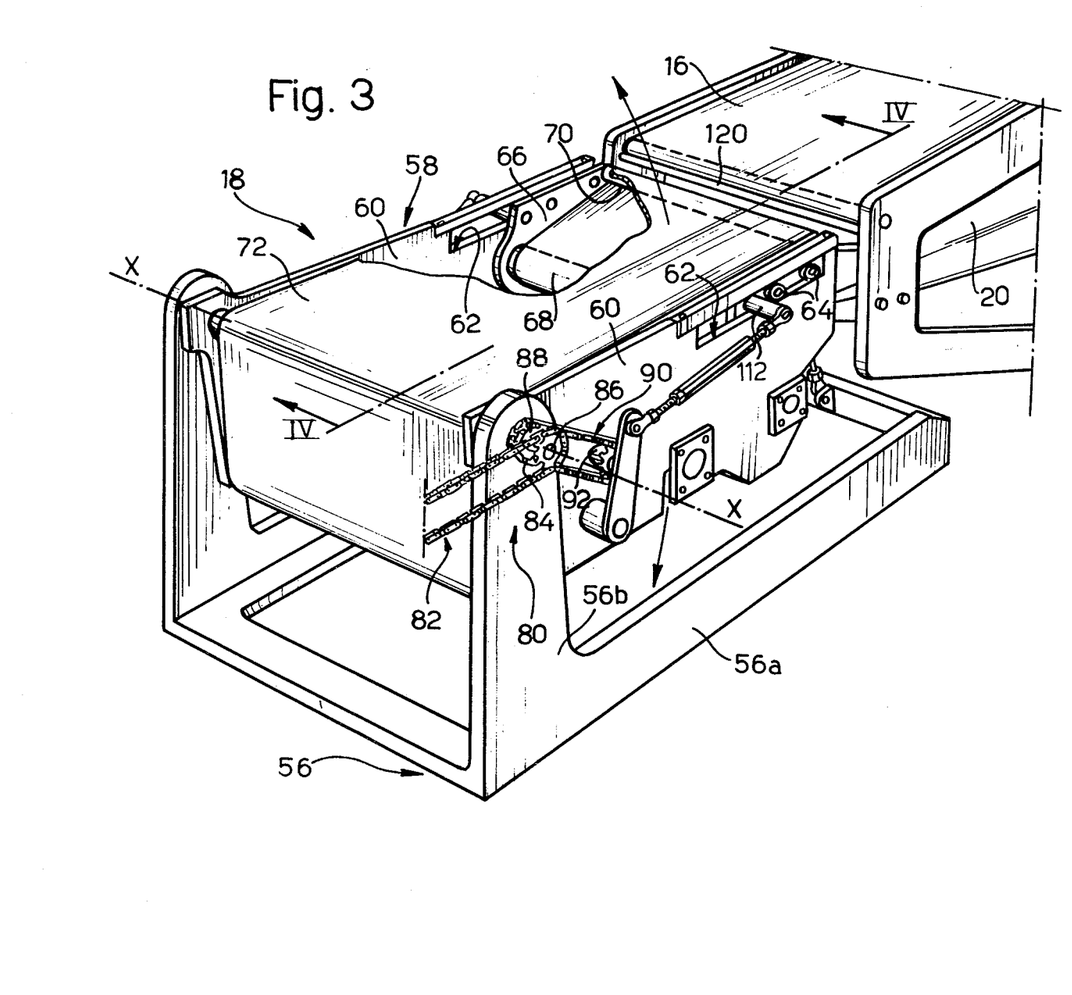
FIG. 3 is a perspective view, partly cut away, of a detail of the installation.
Figure 4:
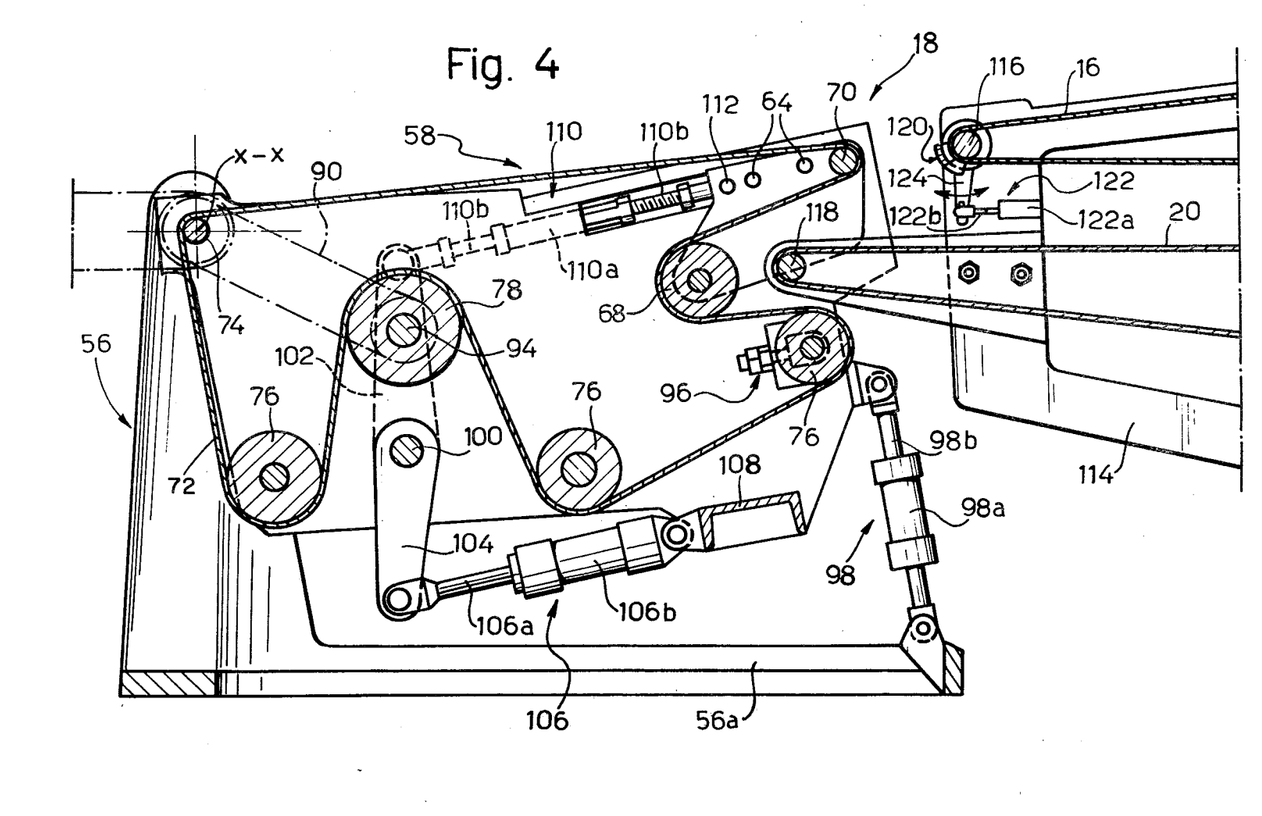
FIG. 4 is a transverse section along line IV—IV of FIG. 3.

As illustrated in greater detail in FIGS. 3 and 4, the alignment and deflecting device 18 comprises a fixed support structure 56 formed by a base 56a provided with two upstanding arms 56b. At the free ends of the arms 56b a movable structure 58 is articulated for pivotal movement about a horizontal axis x—x. The movable structure 58 has two side walls 60 in which respective longitudinally extending slots 62 are formed. A pair of rollers 64 carried by a slide 66 are movable along each of the slots 62. The slide 66 also supports an idler roller 68 and a snub roller 70 adjacent the discharge end of an endless conveyor belt 72 carried by the movable structure 58. The belt 72 is driven continuously in the direction of the arrow $F_1$, FIG. 5. In proximity to its loading end the conveyor belt 72 passes around a roller 74 rotatably mounted on a shaft supported by the side walls 60 of the movable structure 58, the axis of rotation of the roller 74 coinciding with the axis x—x. The side walls 60 also support rotatably three lower idle rollers 76 and a drive roller 78 which is driven by a motor, not shown, through an endless chain transmission indicated diagrammatically by 80. The chain transmission 80 comprises a main chain 82 which transmits motion from the motor to a first sprocket wheel 84 fitted on a shaft 86 projecting outwardly from one of the two support arms 56b the axis of rotation of the shaft 86 coinciding with the axis x—x. The shaft 86 carries a second sprocket wheel 88 which meshes with a drive chain 90 transmitting drive to a sprocket wheel 92 mounted on a shaft 94 coaxial with and mounted on the shaft of the drive roller 78. The idle roller 76 which is adjacent the slide 66 has a screw regulation device 96 by means of which the tension of the conveyor belt 72 may be adjusted in a known way.

Angular displacement of the movable structure 58 is effected by means of an actuator 98 having a cylinder 98a articulated to the base 56a and a piston rod 98b articulated at its free end to the structure 58. A shaft 100 is rotatably mounted at its ends in the side walls 60 of the structure 58 and carries two external arms 102 and a central arm 104 extending perpendicularly to the axis of rotation of the shaft 100. The free end of the central arm 104 (FIG. 4) is pivotally connected to the piston rod 106a of an actuator 106 the cylinder 106b of which is articulated to a cross-bar 108 fixed at its ends to the side walls 60. The free ends of the two external arms 102 are pivotally connected to two bars 110 which at their ends remote from the arms 102, are articulated, through pivot connections 112, to the slide 66. The length of each bar 110 is adjustable in motion by means of a screw-threaded intermediate sleeve 110a within which two separate oppositely screw-threaded parts 110b of the bar 110 are engaged.

Figures 5, 6, 7, 8, 9:
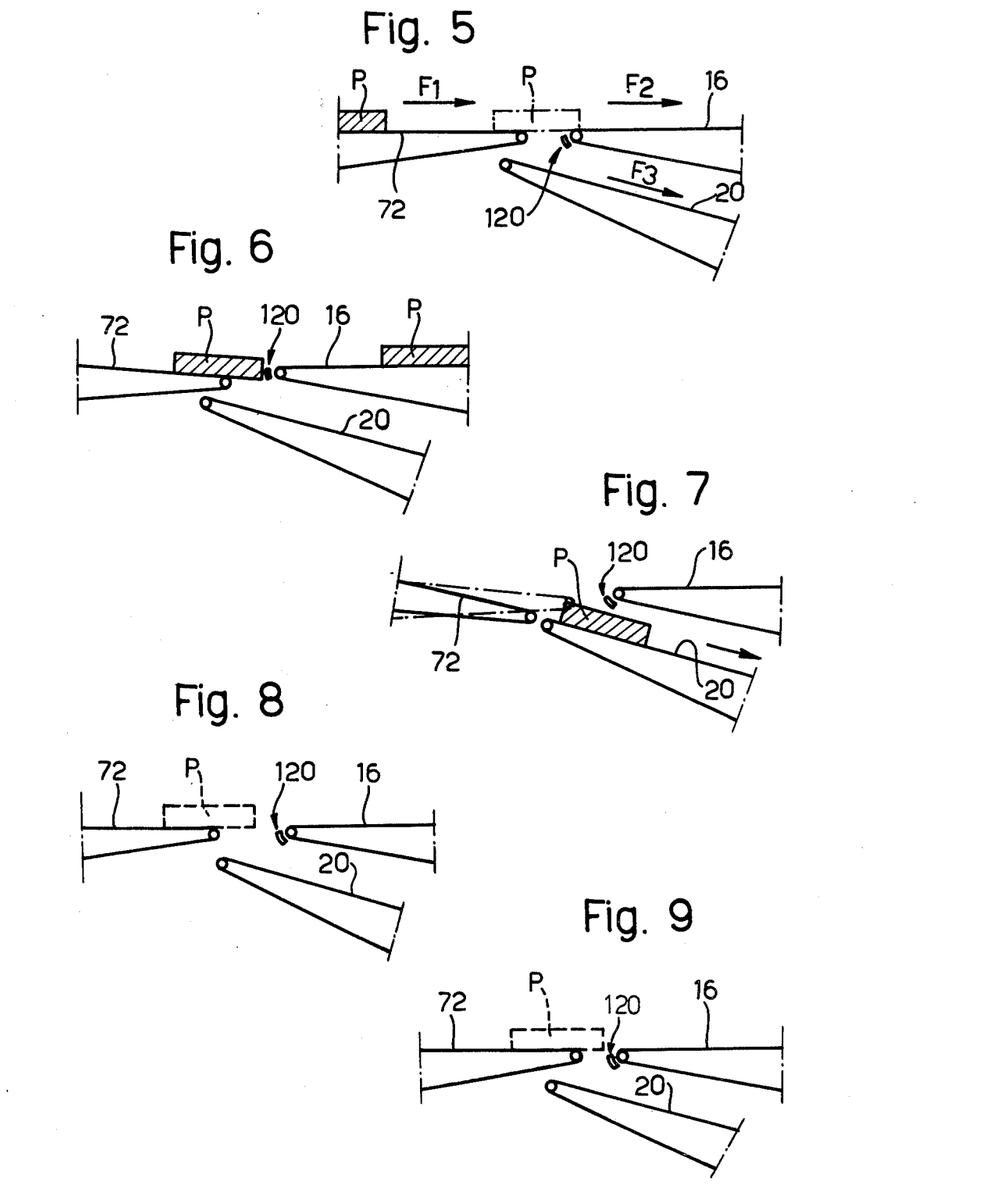
FIG. 5 is a schematic view of the apparatus of FIG. 4 showing the transfer of a product from a first conveyor to a second conveyor.
FIG. 6 is a schematic view of the apparatus of FIG. 4 showing the initial stage of transferring a product from a first conveyor to a third conveyor.
FIG. 7 is a schematic view of the apparatus of FIG. 4 showing the completed transfer of a product from a first conveyor to a third conveyor.
FIG. 8 is a schematic view of the apparatus of FIG. 4 showing the initial stage of transfer of a product from a first conveyor to a second conveyor.
FIG. 9 is a schematic view of the apparatus of FIG. 4 showing a further stage of transfer of a product from a first conveyor to a second conveyor.

A fixed frame 114 supports the conveyor belt 16 which is driven continuously in the direction of the arrow $F_2$ (FIG. 5). The frame 114 also supports, below the conveyor belt 16, the first bunching conveyor belt 20, which is driven continuously in the direction of the arrow $F_3$. Two rollers 116 and 118 are rotatably mounted at their ends in the frame 114. The endless conveyor belts 16 and 20 pass around the rollers 116 and 118 respectively which are located at the loading ends of said conveyors. In front of the loading end of the conveyor belt 16 there is mounted a cross-bar 120 which is displaceable parallel to itself along a circular trajectory about an axis substantially coinciding with the axis of rotation of the roller 116, to which the cross-bar 120 is adjacent. Such displacement is effected by means of an actuator 122 the cylinder 122a of which is articulated to the frame 114 and the piston rod 122b of which is articulated to a crank arm 124 rigidly fixed to the cross-bar 120.

The actuators 98 and 106 are supplied from a source of fluid under pressure (not shown) through an hydraulic distributor 126 (FIG. 1) which is connected to the electrical control device 30.

The alignment conveyor belt 36 (and the corresponding conveyor belt 36a of the secondary conveyor line) is supported, similarly to the conveyor belt 72 of the alignment and deflecting device 18, so as to be capable of oscillation with respect to the fixed suppport structure 40 about a horizontal axis Y—Y coinciding with the axis of rotation of the snub roller adjacent the loading end of the conveyor belt 36.

OPERATION

The operation of the distribution installation will now be described. Products P arriving from a manufacturing installation are conveyed by the conveyor belt 10 in random order on the conveying surface of the belt 10. In order to feed the products P to the two packaging machines 12 of the packaging station S, the alignment and deflecting device 18 controlled, through the distributor 126, to effect the following cycle of sequential operations.

The movable structure 58 is made to perform a slight downward oscillation by means of the actuator 98. At the same time the cross-bar 120 is brought from a rest position in which it is below the roller 116 to a working position in which it is disposed in front of the said roller. Preferably the amplitude of the oscillation of the movable structure 58 is such that the snub roller 70 at the discharge end of the conveyor belt 72 is lowered through a distance about equal to the radius of the roller 116. Alignment of the products P into a transverse row is thereupon effected, the products P impinging against the cross-bar 120, as illustrated in FIG. 6.

As soon as the necessary time for the formation of a transverse row of products P has elapsed, the distributor 126 initiates the displacement of the discharge end of the conveyor belt 72 to a position in which it is aligned with the conveying surface of the first bunching conveyor belt 20. Starting from the moment when the loading end of the conveyor belt 20 is disposed upstream of the discharge end of the conveyor belt 72 with respect to the direction of advance of the products P (FIG. 6), such displacement is effected in the following way. The actuator 98 makes a further downward oscillation of the movable structure 58 and a rearward movement (with respect to the direction of advance of the products P) of the slide 66 is simultaneously effected by the actuator 106. The discharge end of the conveyor belt 72 is then adjacent the loading end of the first bunching conveyor belt 20 so that the transverse row of products P can easily be transferred from the conveyor belt 72 to the conveyor belt 20 by making the conveyor belts advance at the same speed (FIG. 7).

subsequently, as a result of an upward oscillation of the movable structure 58, effected by means of the actuator 98, the conveying surface of the conveyor belt 72 is brought into alignment with the conveying surface of the conveyor belt 16 (FIG. 8). At the same time the actuator 106 displaces the slide 66 forwardly at a speed greater than the conveying speed of the products P, while the cross-bar 120 returns to its rest position. Such displacement of the slide 66 closes the distance between the conveyor belt 72 and the conveyor belt 16 to its initial value (FIG. 9), the speed of the displacement being such as to ensure the integrity of the products P because the discharge end of the conveyor belt 72 moves faster than the products P, preventing them from falling into the space between the conveyor belt 72 and the bunching conveyor belt 20.

The cyclic sequence of said operations is such that the transverse rows of products P is transferred from the conveyor belt 72 to the first bunching conveyor belt 20 up to the moment in which the leading row of the products P intercepts a light beam entering the photocell 32 from an associated light source 32a on the opposite side of the conveyor belt 20 from the photocell 32. At this instant the first bunching conveyor belt 20 is saturated with products P and the output signal of the photocell 32 causes the control device 30 to stop the motor 28 and at the same time to lock the movable structure 58 in the position in which the conveyor belt 72 is aligned with the conveyor belt 16 (FIG. 1) so as to transfer the products P on to the conveyor belt 16 leading to the next successive packaging station.

When the beam entering the photocell 34 of the second bunching conveyor belt 24, from an associated source 34a on the opposite side of the belt 24 from the photocell 34, is not intercepted by any product P, a control signal corresponding to a demand for products on the part of the second bunching conveyor belt 24 is passed to the control device 30. The control device 30 controls, through the speed variator 28, the speed of the drive motor 26 and, therefore, the speed of advance of both the bunching conveyor belts 20 and 24, to an identical speed which is higher than the previous speed of advance of the first bunching conveyor belt 20. In this way the products P on the first bunching conveyor belt 20 are transferred onto the second bunching conveyor belt 24 and, as soon as the leading row of the products P intercepts the beam entering the photocell 34, the corresponding signal sent to the control device 30 causes the latter to re-activate the alignment and deflecting device 18 and to reduce the speed of the first bunching conveyor belt 20 to its initial speed equal to that of the conveyor belt 72, so as to receive a further load of products P in transverse rows. At the same time the control device 30, acting upon the speed variator 28, causes the second bunching conveyor belt 24 to assume a reduced speed relative to the speed immediately previously, matching the speed of the alignment conveyor belt 36, the speed of advance of which is related to the capacity of the packaging machines 12 of the station S. As in the first working phase of the alignment and deflecting device 18, the alignment conveyor belt 36 is made to oscillate cyclically between a first, alignment, position in which its discharge end is at a lower level than the loading end of the transfer conveyor belt 38, so as to cause the abutment of the products P in transverse rows against said loading end of the conveyor belt 38, and a second, inactive position in which the two conveying surfaces of the conveyor belts 36 and 38 are aligned with each other so that the transverse rows of products P are fed onto the transfer conveyor belt 38. The longitudinal spacing between successive transverse rows of products P can be regulated and adapted to what is required by the packaging machines 12 downstream of the distribution installation by varying the interval of time for which the alignment conveyor belt 36 remains in said first position.

The transfer conveyor belt 38 is supported so as to be able to assume two positions in which it is aligned with the platform 42 and with the conveyor belt 46 respectively. In the first position, shown in full lines in FIG. 1, the transverse rows of products P are transferred onto the platform 42 which, in response to demand from the first packaging machine 12, allows the row of products P supported by it to fall on to the transverse conveyor belt 44 which feeds the products in a single longitudinal file to the said packaging machine. When this first packaging machine 12 is saturated or damaged, the transverse conveyor belt 38 assumes its second position, transferring the product P onto the conveyor belt 46 which conveys the transverse rows of products P to the second transverse conveyor belt 44 which feeds the second packaging machine 12 of the packaging station S.

Figure 2:
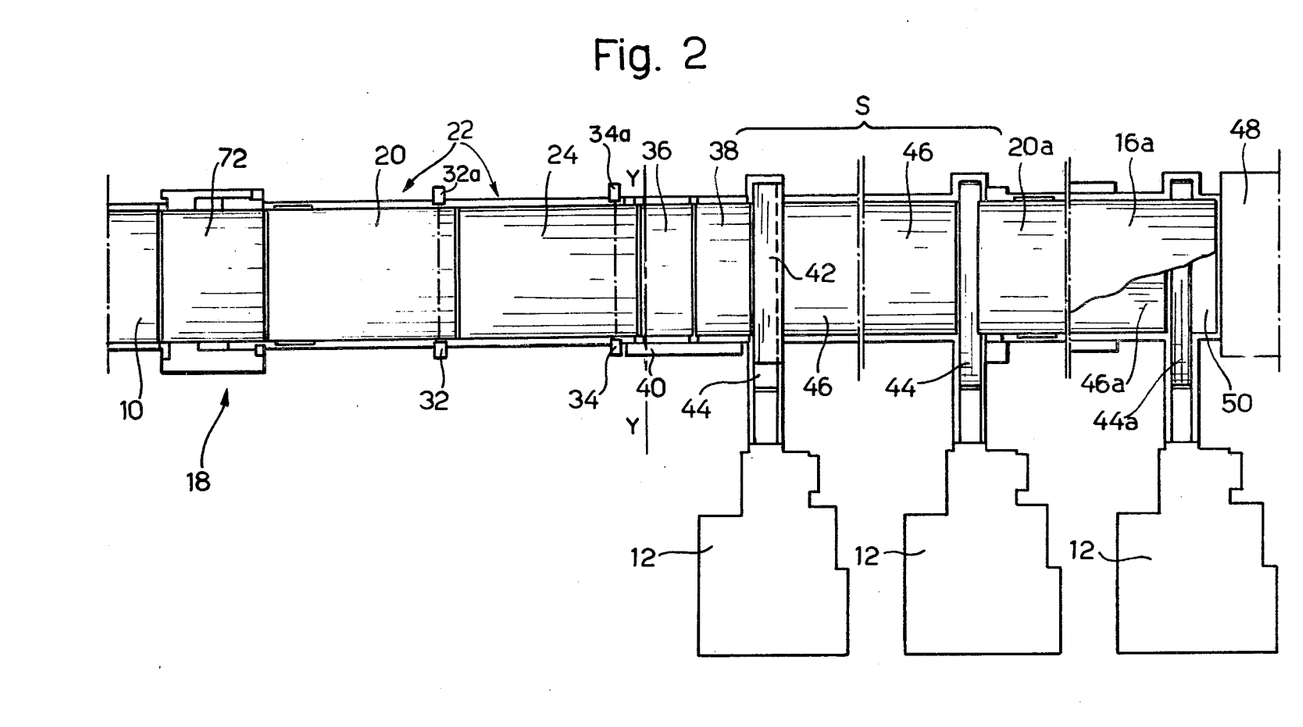
FIG. 2 is a plan view of the installation, sectioned along the line II—II of FIG. 1.

The products P which are not accepted by the first packaging station S are fed by the upper conveyor belt 16 to the alignment and deflecting device 18a which, in a manner completely analogous to the operation of the alignment and deflecting device 18 already described, distributes the products P towards the first bunching conveyor belt 20a of the second conveyor line supplying the two transverse conveyor belts 44a of the second packaging station, one only of the conveyor belts 44a being shown in FIG. 2. In the event of products P not being accepted by the second packaging station, they are transferred by the alignment and deflecting device 18a to the conveyor belt 16a of the primary conveyor line 14 which leads to the bunching device 48.

In the case in which a simultaneous stoppage of one or more packaging machines occurs a proportion of the unwrapped products P reaches said bunching device 48 which transfers the products, on demand, to the distribution conveyor belt 52 through the lower recycling conveyor belt 50. When the distribution conveyor belt 52 is saturated with products P, its direction of advance is reversed so as to transfer the products P from the conveyor belt 52 onto the conveyor belt 54, which in the meantime has been brought into the active position in which its conveying surface is aligned with that of the distribution conveyor belt 52. The products P are thereby returned to the first secondary conveyor line 22 to be wrapped at the packaging station S.

Figure 1:
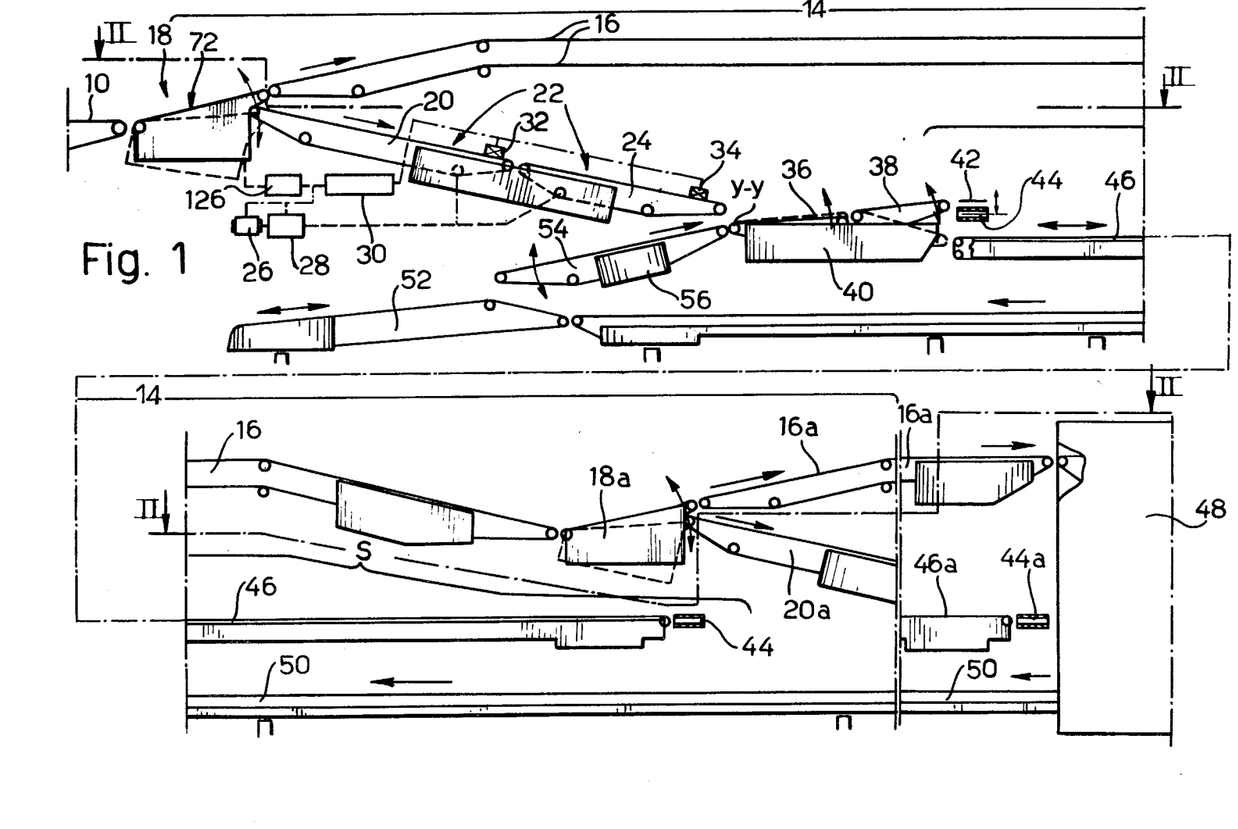
FIG. 1 is a partial view in elevation of a distribution installation according to one embodiment of the invention.

In the example illustrated in FIGS. 1 and 2 the operation of the distribution installation has been described in relation to two packaging stations. It will, however, be apparent that this invention can be extended to the case where there is a greater number of packaging stations. Similarly the invention can also be applied with advantage in the case where each packaging station comprises a single packaging machine or more than two packaging machines.

From the preceding description it will also be evident how the installation according to this invention is able to ensure a satisfactory saturation of the packaging machines. In fact, the insertion of the secondary conveyor lines between the primary conveyor line and the transverse conveyor belts which feed the packaging machines enables each packaging machine to be fed with products at an appropriate rate controlled according to the demand of the machine itself, independently of the rate of arrival of products P from the manufacturing installation along the primary conveyor line 14.

As described above the alignment of the products P into transverse rows is affected in a simple and sure way by the device 18 or the alignment conveyor belt 36 which, unlike the devices used until now, do not have recourse to transverse stopping means for effecting alignment by displacement transverse to the direction of advance of the products and to sensing means, responsive to the position of the products on the conveyor belt, connected to such transverse stopping means to control the operation of the latter in dependence upon the position of the products.

Other equally useful forms of alignment device 18 may be employed. Thus for example the discharge end of the first alignment conveyor belt 72 and the adjacent loading end of the second conveyor belt 16 could be supported in reciprocal fixed positions in which the said discharge end is spaced from the lower than the said loading end by an amount sufficient to cause stoppage of the products P against said loading end and alignment of the products in transverse rows. In this embodiment the transfer of the products aligned on the second conveyor belt can be effected by means of, for example, a blower device which is operated periodically to direct across the entire width of the conveyor belts a jet of air under pressure, directed upwards to support the products as they pass from the first to the second conveyor belt. Alternatively, the transfer of the aligned products from the first to the second conveyor belt could be effected by cyclic displacement of a movable platform which is displaceable between an inactive position in which it is remote from the space between said two adjacent ends of the conveyor belts and an active position in which it is interposed between said ends and acts as a bridge between said two conveyor belts.

Preferably also in such alternative embodiments of the alignment device 18 a transverse abutment member similar to the cross-bar 120 would be mounted in a way that can be displaced between a rest position in which it is remote from the space between the discharge end of the first conveyor belt and the loading end of the second conveyor belt and a working position in which it is located between said ends to stop the products, thus preventing the products themselves from coming into direct contact with the loading end of the second conveyor belt, which could damage the products or cause them to fall off the conveyor belt.

What is claimed is:

1. Installation for the distribution of food products, particularly confectionery products, of the type comprising:
    a number of conveyors aligned longitudinally to carry along a primary conveyor line rows of said products extending transverse to the direction of movement of the conveyor;
    a first alignment device for aligning the products in transverse longitudinally spaced apart rows along said such primary conveyor line;
    a number of transverse conveyors, arranged transversely with respect to the primary conveyor line, to receive rows of products from said primary conveyor line and feed them in single longitudinal files to respective packaging machines, and
    a number of transfer means, disposed upstream of each transverse conveyor, to transfer transverse rows of products from said primary conveyor line to the respective transverse conveyors, wherein the transfer means each comprise:
    a secondary conveyor line (22), for conveying transverse rows of products (P) in a direction generally parallel to the direction of the primary conveyor line (14), said secondary conveyor line (22) comprising a first bunching conveyor (20), capable of assuming selectively a first speed matched to that of the primary conveyor line (14) and a second speed, higher than said first speed, and a second bunching conveyor (24) capable of assuming selectively a first speed matched to that of the respective transverse conveyor (44) and a second speed equal to the second speed of the first bunching conveyor (20);
    a deflecting device (18) movable between an inactive position and an active position in which it deflects transverse rows of products (P) from the primary conveyor line (14) to the first bunching conveyor (20) of the secondary conveyor line (22);
    a second alignment device (36) to align the products (P) supplied by the second bunching conveyor (24) of the secondary conveyor line (22) in transverse longitudinally spaced apart rows;
    a transfer device (38) for transferring transverse rows of products (P) to said respective transverse conveyor (44);
    drive means (26, 28, 126) for driving intermittently the two bunching conveyors (20, 24) and control means (30,32,34) for activating said drive means (26, 28, 126) in a repeated cycle of operations comprising:

(i) moving the first bunching conveyor (20) at its first speed and stopping it when it is saturated with products (P), simultaneously displacing the deflecting device (18) to its inactive position;
   (ii) moving both bunching conveyors (20,24) at their second speed in order to transfer all the products (P) from the first (20) to the second bunching conveyor (24);
   (iii) moving the second bunching conveyor (24) at its first speed, while the deflecting device (18) is displaced into its active position and the first bunching conveyor (20) resumes its first speed to be reloaded with products (P);
   (iv) aligning the products (P) fed by the second bunching conveyor (24) in transverse longitudinally spaced apart rows, and
   (v) transferring the transverse rows of products (P) to the transverse conveyor (44) by means of the transfer device (38).

2. Installation as in claim 1, wherein two transverse conveyors (44) are disposed downstream of each secondary conveyor line (22) and wherein the transfer device (3) comprises a conveyor (38) displaceable between a first feeding position in which it feeds products to the first transverse conveyor (44) and a second feeding position in which it feeds products to the second transverse conveyor (44).

3. Installation as in claim 1, wherein each said alignment device (18; 36, 38) comprises a first and a second conveyor (72, 16; 36, 38) arranged in series with each other, and connecting means (58, 66) associated with the two conveyors (72, 16); said two conveyors (72,16; 36,38) being adapted to operate cyclically between
    an active alignment position in which the discharge end of the first conveyor (72,36) is spaced from and lower than the loading end of the second conveyor (16,38) by an amount sufficient to cause the stoppage and alignment in transverse rows of products (P) against said loading end, and
    a transfer position, in which the connecting means (58, 66) are activated to ensure the transfer of the aligned products (P) onto the second conveyor (16, 38).

4. Installation according to claim 3, wherein the discharge end of the first conveyor (72, 36) is supported for displacement with respect to the loading end of the second conveyor (16, 38) and including actuator means (58, 66,98,106) adapted to displace cyclically said discharge end between said active alignment position and its transfer position, said discharge end in said transfer position being coplanar with the loading end of the second conveyor (16, 38) and spaced from the latter by an amount sufficient to ensure transfer of the aligned products (P) from the first conveyor (72,36) on to the second conveyor (16, 38).

5. Installation as in claim 4, wherein the first bunching conveyor (20) of the secondary conveyor line (22) is aligned longitudinally with and disposed below the two conveyors (72,16) of the first alignment device (18) with its loading end (118) disposed upstream of the discharge end (70) of the first conveyor (72) of said alignment device (18) when said discharge end (70) is in the transfer position, said discharge end (70) of the first conveyor (72) of the first alignment device (18) having displaceable support means for displacement of said discharge end (70) from the transfer position to the active alignment position by a small downward displacement and, succesively, to a third deflecting position, by a further downward displacement of the said discharge end (70), and a rearward translation contrary to the conveying direction, to be substantially coplanar with the loading end (118) of the first bunching conveyor (20) of the secondary conveyor line (22); the return to the transfer position being effected by upward displacement to a position in which said discharge end (70) is substantially coplanar with the loading end (116) of the second conveyor (16) of said first alignment device (18), followed by a forward translation in the conveying direction at a speed greater than the speed of conveyance of the products (P).

6. Installation as in claim 5, wherein the first conveyor (72) of the first alignment device (18) is carried by a movable structure (58) pivotable about a horizontal axis (X—X) with respect to a fixed support structure (56) and including a slide (66) movable in the movable structure (58) parallel to the conveying surface of the said first conveyor (72); said slide (66) supporting a snub roller (70) adjacent the discharge end of the said first conveyor (72).

7. Installation as in claim 6, including fluid pressure actuators (98, 106) for effecting displacement of the movable structure (58) and of the slide (66).

8. Installation as in claim 3, wherein the first alignment device includes a transverse abutment member (120) mounted displaceably between a rest position in which it is remote from the space between the discharge end (70) of the first conveyor (72) and the loading end (116) of the second conveyor (16) of said first alignment device (18) and a working position in which it is disposed between said ends (70,116) to stop the products (P) when said two conveyors (72, 16) operate in the active alignment position.

9. Installation as in claim 8, wherein the transverse abutment member comprises a cross-bar (120) displaceable parallel to its length along a circular trajectory about an axis substantially coinciding with the axis of rotation of the return roller (116) adjacent the loading end of the second conveyor (16) of said alignment device (18).

10. Installation as in claim 9, including a fluid pressure actuator (122) having a movable piston rod (122b) and a crank arm (124) articulated to said actuator piston rod (122b) and connected to said cross-bar (120) to effect displacement of the latter.

11. Installation as in claim 1, including a further bunching device (48) disposed at the terminal end of the primary conveyor line (14), to gather the products (P) delivered to said end and a recycling conveyor (50) to transfer such products (P) from the said further bunching device (48) to one of the secondary conveyor lines (22).

* * * * *